United States Patent [19]
Durham

[11] Patent Number: 5,623,856
[45] Date of Patent: Apr. 29, 1997

[54] BICYCLE CRANK ARM WITH INTERNAL FLANGE

[76] Inventor: Roger O. Durham, 1370 Thompson Ave., Glendale, Calif. 91201

[21] Appl. No.: 456,185

[22] Filed: May 31, 1995

[51] Int. Cl.$^6$ ........................................ G05G 1/14
[52] U.S. Cl. ........................ 74/594.1; 74/579 R
[58] Field of Search .................. 74/594.1, 594.2, 74/579 R; 280/260, 261

[56] References Cited

U.S. PATENT DOCUMENTS

| | | | |
|---|---|---|---|
| 4,811,626 | 3/1989 | Benzin | 74/594.1 |
| 5,010,785 | 4/1991 | Romero | 74/579 R X |
| 5,179,873 | 1/1993 | Girvin | 74/594.1 |
| 5,197,353 | 3/1993 | Trenerry et al. | 74/594.2 |
| 5,435,869 | 7/1995 | Christensen | 74/594.1 |

FOREIGN PATENT DOCUMENTS

| | | | |
|---|---|---|---|
| 417313 | 11/1910 | France | 74/594.1 |
| 861561 | 2/1941 | France | 74/594.1 |
| 51260 | 2/1942 | France | 74/594.1 |
| 980071 | 5/1951 | France | 74/594.1 |
| 850275 | 7/1952 | Germany | 74/594.1 |
| 2225296 | 5/1990 | United Kingdom | 74/594.1 |

*Primary Examiner*—Vinh T. Luong

[57] ABSTRACT

A bicycle crank arm has an internal flange with a plurality of mounting holes for receiving mounting fasteners. The internal flange allows the crank arm to be wider, which lends it to being cast out of a light alloy, such as magnesium or aluminum, producing a stronger and more rigid crank arm of reduced weight. Also, the mounting fasteners and the internal flange are hidden from sight, enhancing the appearance of the crank arm.

5 Claims, 1 Drawing Sheet

BICYCLE CRANK ARM WITH INTERNAL FLANGE

CROSS REFERENCES TO RELATED APPLICATIONS

My current applications, entitled, BICYCLE CRANKSHAFT SPINDLE WITH MOUNTING FLANGE Ser. No. 08/429,046, and FLANGE-MOUNTED CRANK ARM FOR BICYCLE Ser. No. 08/488,139, both relate to this application.

BACKGROUND OF THE INVENTION

1. Field of the Invention

This invention pertains to bicycle crankshafts wherein a crank arm is secured to a flanged crankshaft spindle, as disclosed in my copending application entitled: BICYCLE CRANKSHAFT SPINDLE WITH MOUNTING FLANGE Ser. No. 08/429,046.

2. Description of the Prior Art

Another co-pending application Ser. No. 08/448,139, entitled FLANGE-MOUNTED CRANKARM FOR BICYCLE shows how the large end of a tubular crankarm is welded into a hole in a mounting flange. The arm must be small enough to fit within the bolt pattern, and smallness is inefficient structurally. Also, the flange and the mounting fasteners are both visible.

SUMMARY OF THE INVENTION

According to the invention, a bicycle crank arm has an internal flange with a plurality of holes for receiving mounting fasteners. The arm is preferably hollow, having an internal cavity along most of its length. The resulting wider crank arm lends itself to casting out of light alloy, such as aluminum or magnesium. Appearance is enhanced because the flange and mounting fasteners are hidden from sight within the crank arm.

The invention thus has several objects:

1. to provide a crank arm having an internal flange which is hidden within the arm.

2. to provide a crank arm which hides the mounting fasteners within it, thus presenting a better appearance.

3. to provide a crank arm which lends itself to casting by having an internal cavity in the arm which can readily be formed by a core, and by having a smooth external surface.

4. to provide a crank arm of increased size and structural efficiency.

DETAILED DESCRIPTION OF THE DRAWINGS

Figure 1:
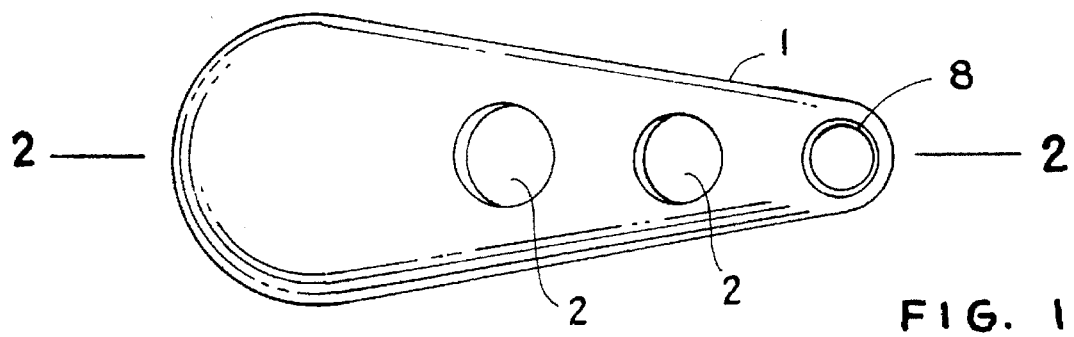
FIG. 1 shows a side view of the internally-flanged crank arm according to the invention.

Referring to the drawings, an internally flanged crank arm 1 includes a pedal-mounting hole 8 at one end for engagement with a bicycle pedal which is not shown. Said pedal-mounting hole 8 may be threaded to receive the threaded spindle of a bicycle pedal.

Figure 2:
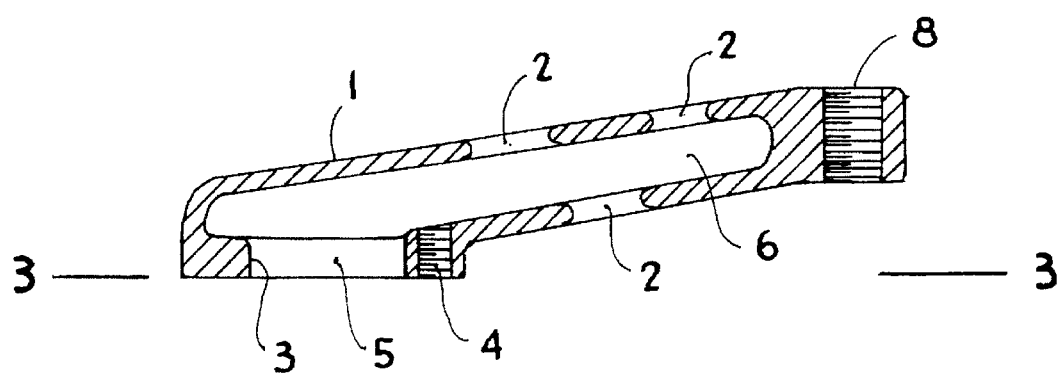
FIG. 2 is a section taken along line 2—2 of FIG. 1.
Figure 3:
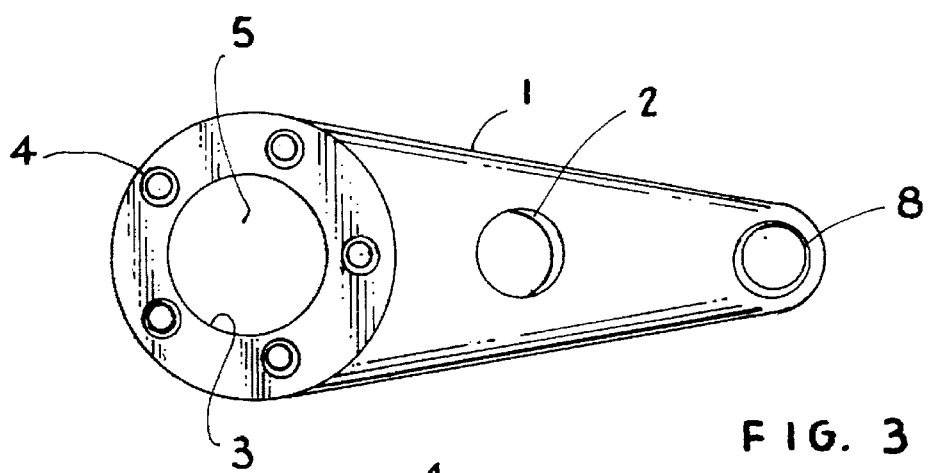
FIG. 3 is a view of the opposite side of the internally-flanged crank arm, taken along line 3—3 of FIG. 2.

The internally-flanged crank arm 1 is preferably hollow, having an internal cavity 6 extending most of its length. At its opposite end, said arm 1 includes an internal flange 3 having a plurality of mounting holes 4 for receiving mounting fasteners. Said mounting holes 4 are preferably threaded to receive the ends of mounting bolts. The internal flange 3 also includes a mounting surface 7 which is preferably flat. The internal cavity 6 terminates as an aperture 5 through the internal flange 3 as shown in FIGS. 2–4.

Figure 4:
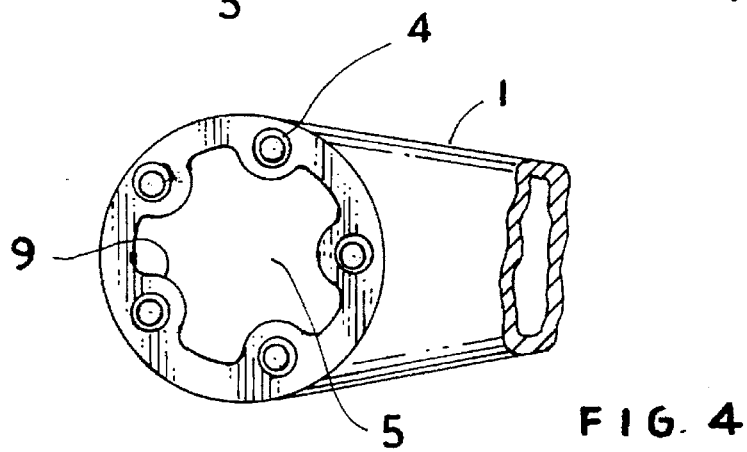
FIG. 4 shows an alternate configuration, wherein the internal mounting flange includes a plurality of lugs.

The internally-flanged crank arm 1 may have one or a plurality of lightening holes 2 in it, for the sake of appearance, for reduced weight, or for use as core holes in casting.

Where said internal flange 3 is shown to be of uniform width, said internal flange 3 could include a plurality of lugs 9 as shown in FIG. 4.

MODE OF OPERATION

A pedal inserts into the pedal-mounting hole 8. A plurality of mounting fasteners, which would usually be bolts, insert into said mounting holes 4 to secure the internally-flanged crank arm 1 with a flanged crankshaft spindle which is not shown.

I claim:

1. A hollow, internally-flanged crankarm including: (a) a pedal mounting hole; (b) an internal flange having a mounting surface and a plurality of mounting holes; and (c) an internal cavity terminating as an aperature through said internal flange.

2. Apparatus according to claim 1, wherein said mounting holes in said internal mounting flange are threaded.

3. Apparatus according to claim 1 wherein said pedal mounting hole is threaded to receive a threaded pedal spindle.

4. Apparatus according to claim 1, wherein said internally-flanged crank arm includes at least one lightening hole.

5. Apparatus according to claim 1 wherein said internal flange includes a plurality of lugs.

* * * * *